(12) United States Patent
Wagner et al.

(10) Patent No.: US 12,012,285 B2
(45) Date of Patent: Jun. 18, 2024

(54) SYSTEMS AND METHODS FOR PROCESSING OBJECTS INCLUDING A LINEAR GANTRY SYSTEM

(71) Applicant: Berkshire Grey Operating Company, Inc., Bedford, MA (US)

(72) Inventors: Thomas Wagner, Concord, MA (US); Kevin Ahearn, Nebo, NC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Victoria Hinchey, Winchester, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

(21) Appl. No.: 17/730,036

(22) Filed: Apr. 26, 2022

(65) Prior Publication Data
US 2022/0250838 A1 Aug. 11, 2022

Related U.S. Application Data

(63) Continuation of application No. 16/776,870, filed on Jan. 30, 2020, now Pat. No. 11,358,794, which is a
(Continued)

(51) Int. Cl.
*B65G 1/137* (2006.01)
*B25J 9/00* (2006.01)
(Continued)

(52) U.S. Cl.
CPC ............ *B65G 1/137* (2013.01); *B25J 9/0093* (2013.01); *B25J 9/026* (2013.01); *B25J 9/1612* (2013.01);
(Continued)

(58) Field of Classification Search
CPC .... B65G 1/137; B65G 1/1376; B65G 1/1378; B65G 47/82; B65G 47/905;
(Continued)

(56) References Cited

U.S. PATENT DOCUMENTS

| 4,412,775 A | 11/1983 | Molitor et al. |
| 4,557,659 A | 12/1985 | Scaglia |

(Continued)

FOREIGN PATENT DOCUMENTS

| AU | 2006204622 A1 | 3/2007 |
| CA | 2985166 A1 | 12/2016 |

(Continued)

OTHER PUBLICATIONS

Communication pursuant to Article 94(3) EPC issued by the European Patent Office in related European Patent Application No. 18717156.6 dated Oct. 28, 2022, 4 pages.
(Continued)

*Primary Examiner* — Thomas Randazzo
(74) *Attorney, Agent, or Firm* — Gesmer Updegrove LLP

(57) ABSTRACT

A storage, retrieval and processing system for processing objects is disclosed. The storage, retrieval and processing system includes a plurality of storage bins providing storage of a plurality of objects, where the plurality of storage bins
(Continued)

being in communication with a retrieval conveyance system, a programmable motion device in communication with the retrieval conveyance system for receiving the storage bins from the plurality of bins, where the programmable motion device includes an end effector for grasping and moving a selected object out of a selected storage bin, and is adapted for movement of the programmable motion device along a first direction, and a plurality of destination bins that are provided in at least one linear arrangement along the first direction of movement of the programmable motion device.

28 Claims, 14 Drawing Sheets

Related U.S. Application Data continuation of application No. 15/923,765, filed on Mar. 16, 2018, now Pat. No. 10,596,696.

(60) Provisional application No. 62/473,082, filed on Mar. 17, 2017.

(51) Int. Cl.
*B25J 9/02* (2006.01)
*B25J 9/16* (2006.01)
*B65G 47/82* (2006.01)
*B65G 47/90* (2006.01)

(52) U.S. Cl.
CPC .......... *B25J 9/1615* (2013.01); *B65G 1/1376* (2013.01); *B65G 1/1378* (2013.01); *B65G 47/82* (2013.01); *B65G 47/905* (2013.01); *B65G 2201/0258* (2013.01)

(58) Field of Classification Search
CPC . B65G 2201/0258; B25J 9/0093; B25J 9/026; B25J 9/1612; B25J 9/1615
See application file for complete search history.

(56) References Cited

U.S. PATENT DOCUMENTS

| | | | |
|---|---|---|---|
| 4,678,390 | A | 7/1987 | Bonneton et al. |
| 4,722,653 | A | 2/1988 | Williams et al. |
| 4,846,619 | A | 7/1989 | Crabtree et al. |
| 5,082,103 | A | 1/1992 | Ross et al. |
| 5,281,081 | A | 1/1994 | Kato |
| 5,595,263 | A | 1/1997 | Pignataro |
| 6,011,998 | A | 1/2000 | Lichti et al. |
| 6,036,812 | A | 3/2000 | Williams et al. |
| 6,059,092 | A | 5/2000 | Jerue et al. |
| 6,079,570 | A | 6/2000 | Oppliger et al. |
| 6,377,867 | B1 | 4/2002 | Bradley et al. |
| 6,390,756 | B1 | 5/2002 | Isaacs et al. |
| 6,505,093 | B1 | 1/2003 | Thatcher et al. |
| 6,579,053 | B1 | 6/2003 | Grams et al. |
| 8,776,694 | B2 | 7/2014 | Rosewinkel et al. |
| 8,997,438 | B1* | 4/2015 | Fallas .................. B25J 9/0093 901/17 |
| 9,020,632 | B2 | 4/2015 | Naylor |
| 9,102,336 | B2 | 8/2015 | Rosenwinkel |
| 9,481,518 | B2 | 11/2016 | Neiser |
| 9,688,471 | B2 | 6/2017 | Hellenbrand |
| 9,751,693 | B1 | 9/2017 | Battles et al. |
| 9,821,464 | B2 | 11/2017 | Stiernagle et al. |
| 9,878,349 | B2 | 1/2018 | Crest et al. |
| 10,029,865 | B1 | 7/2018 | McCalib, Jr. et al. |
| 10,596,696 | B2* | 3/2020 | Wagner ................ B65G 1/1376 |
| 2002/0092801 | A1 | 7/2002 | Dominguez |
| 2002/0157919 | A1* | 10/2002 | Sherwin ................ B65G 47/52 198/370.01 |
| 2003/0014376 | A1 | 1/2003 | DeWitt et al. |
| 2003/0075051 | A1 | 4/2003 | Watanabe et al. |
| 2005/0268579 | A1* | 12/2005 | Natterer ................. B65B 7/164 53/553 |
| 2008/0046116 | A1 | 2/2008 | Khan et al. |
| 2008/0113440 | A1 | 5/2008 | Gurney et al. |
| 2008/0181753 | A1 | 7/2008 | Bastian et al. |
| 2008/0232938 | A1* | 9/2008 | Weed ..................... B65G 21/06 414/222.11 |
| 2009/0047178 | A1 | 2/2009 | Chojnacki et al. |
| 2010/0276248 | A1* | 11/2010 | Gut ........................ B65G 47/82 198/370.02 |
| 2011/0238207 | A1 | 9/2011 | Bastian, II et al. |
| 2011/0243707 | A1 | 10/2011 | Dumas et al. |
| 2012/0118699 | A1 | 5/2012 | Buchmann et al. |
| 2012/0177465 | A1 | 7/2012 | Koholka |
| 2012/0219397 | A1* | 8/2012 | Baker .................. B65G 1/1373 414/796 |
| 2013/0110280 | A1 | 5/2013 | Folk |
| 2013/0334158 | A1 | 12/2013 | Koch |
| 2014/0086709 | A1 | 3/2014 | Kasai |
| 2014/0086714 | A1 | 3/2014 | Malik |
| 2014/0244026 | A1* | 8/2014 | Neiser .................. B65G 1/1378 700/216 |
| 2014/0277693 | A1 | 9/2014 | Naylor |
| 2015/0098775 | A1 | 4/2015 | Razumov |
| 2015/0114799 | A1 | 4/2015 | Hansl et al. |
| 2015/0203297 | A1 | 7/2015 | Manning et al. |
| 2015/0346708 | A1* | 12/2015 | Mattern ................. B25J 21/00 700/114 |
| 2016/0075521 | A1 | 3/2016 | Puchwein et al. |
| 2016/0136816 | A1 | 5/2016 | Pistorino |
| 2016/0167227 | A1* | 6/2016 | Wellman ................ B65G 1/10 901/3 |
| 2016/0176638 | A1 | 6/2016 | Toebes |
| 2016/0244262 | A1 | 8/2016 | O'Brien et al. |
| 2016/0325934 | A1 | 11/2016 | Stiernagle et al. |
| 2016/0347545 | A1* | 12/2016 | Lindbo ................... B65G 61/00 |
| 2017/0043953 | A1 | 2/2017 | Battles et al. |
| 2017/0080566 | A1 | 3/2017 | Stubbs et al. |
| 2017/0121114 | A1 | 5/2017 | Einav et al. |
| 2017/0282634 | A1* | 10/2017 | Jones ....................... B65H 5/08 |
| 2017/0322561 | A1 | 11/2017 | Stiernagle |
| 2017/0349385 | A1 | 12/2017 | Moroni et al. |
| 2018/0085788 | A1 | 3/2018 | Engel et al. |
| 2018/0244473 | A1* | 8/2018 | Mathi .................. B65G 47/905 |

FOREIGN PATENT DOCUMENTS

| | | |
|---|---|---|
| CN | 102390701 A | 3/2012 |
| DE | 102004001181 A1 | 8/2005 |
| DE | 102007028680 A1 | 12/2008 |
| DE | 102007038834 A1 | 2/2009 |
| DE | 102010002317 | 8/2011 |
| DE | 102012102333 A1 | 9/2013 |
| EP | 0235488 A1 | 1/1990 |
| EP | 0767113 A2 | 4/1997 |
| EP | 2233400 A1 | 9/2010 |
| EP | 2650237 A1 | 10/2013 |
| EP | 2937299 A1 | 10/2015 |
| EP | 3112295 A1 | 1/2017 |
| JP | S54131278 A | 10/1979 |
| JP | H08157016 A | 6/1996 |
| NL | 2650237 A1 * | 10/2013 ........... B65G 1/1378 |
| WO | 03095339 A1 | 11/2003 |
| WO | 2008091733 A2 | 7/2008 |
| WO | 2011038442 A2 | 4/2011 |
| WO | 2012127102 A1 | 9/2012 |
| WO | 2014166650 A1 | 10/2014 |
| WO | 2015118171 A1 | 8/2015 |
| WO | 2016100235 A1 | 6/2016 |
| WO | 2017081281 A1 | 5/2017 |

OTHER PUBLICATIONS

Anver Corporation: Vacuum Tube Lifting Systems, Nov. 22, 2004 (http://www.jrgindustries.com/assets/anver.pdf).

(56) References Cited

OTHER PUBLICATIONS

Communication pursuant to Article 94(3) EPC issued by the European Patent Office in related European Patent Application No. 18717156.6 dated Nov. 11, 2021, 4 pages.
Communication pursuant to Rules 161(1) and 162 EPC issued by the European Patent Office dated Oct. 25, 2019 in related European Patent Application No. 18717156.6, 3 pages.
Examiner's Report issued by the Innovation, Science and Economic Development Canada in related Canadian Patent Application No. 3,056,640 dated Nov. 10, 2020, 3 pages.
Examiner's Report issued by the Innovation, Science and Economic Development Canada in related Canadian Patent Application No. 3,056,640 dated Jul. 13, 2021, 3 pages.
First Office Action issued by the National Intellectual Property Administration, P.R.C in related Chinese Patent Application No. 201880018941.4 dated Sep. 21, 2020, 15 pages.
International Preliminary Report on Patentability issued by the International Bureau of WIPO dated Sep. 17, 2019 in related International Application No. PCT/US2018/022927, 7 pages.
International Search Report and Written Opinion of the International Searching Authority dated Jun. 25, 2018 in related International Application No. PCT/US2018/022927, 10 pages.
Non-Final Office Action issued by the U.S. Patent and Trademark Office dated Mar. 14, 2019 in related U.S. Appl. No. 15/923,765, 19 pages.
Non-Final Office Action issued by the U.S. Patent and Trademark Office in related U.S. Appl. No. 16/776,870 dated Dec. 1, 2021, 10 pages.

\* cited by examiner

SYSTEMS AND METHODS FOR PROCESSING OBJECTS INCLUDING A LINEAR GANTRY SYSTEM

PRIORITY

The present application is a continuation of U.S. patent application Ser. No. 16/776,870, filed Jan. 30, 2020, now U.S. Pat. No. 11,358,794, issued Jun. 14, 2022, which is a continuation of U.S. patent application Ser. No. 15/923,765 filed Mar. 16, 2018, now U.S. Pat. No. 10,596,696, issued Mar. 24, 2020, which claims priority to U.S. Provisional Patent Application Ser. No. 62/473,082, filed Mar. 17, 2017, the-disclosures of which are hereby incorporated by reference in their entireties.

BACKGROUND

The invention generally relates to storage and retrieval systems, and relates in particular to automated storage and retrieval systems that are used with systems for processing objects.

Automated storage and retrieval systems (AS/RS) generally include computer controlled systems of automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects.

SUMMARY

In accordance with an embodiment, the invention provides a storage, retrieval and processing system for processing objects. The storage, retrieval and processing system includes a plurality of storage bins providing storage of a plurality of objects, where the plurality of storage bins being in communication with a retrieval conveyance system, a programmable motion device in communication with the retrieval conveyance system for receiving the storage bins from the plurality of bins, where the programmable motion device includes an end effector for grasping and moving a selected object out of a selected storage bin, and is adapted for movement of the programmable motion device along a first direction, and a plurality of destination bins that are provided in at least one linear arrangement along the first direction of movement of the programmable motion device.

In accordance with another embodiment, the storage, retrieval and processing system includes a plurality of storage bins providing storage of a plurality of objects, where the plurality of storage bins being in communication with a retrieval conveyance system that includes automated means for providing selected storage bins to an input conveyance system, a programmable motion device in communication with the input conveyance system for receiving the selected storage bins from the plurality of bins, where the programmable motion device includes an end effector for grasping and moving a selected object out of each selected storage bin, and is adapted for movement of the programmable motion device along a first direction, and a plurality of destination bins being provided in at least one linear arrangement along the first direction of movement of the programmable motion device.

In accordance with a further embodiment, the invention provides a method of providing storage, retrieval and processing of objects. The method includes the steps of providing a plurality of storage bins for storing a plurality of objects, where the plurality of storage bins being in communication with a retrieval conveyance system, receiving a plurality of selected storage bins from the plurality of storage bins at a processing area in communication with a programmable motion device, grasping and moving selected objects out of a plurality of selected storage bins, and providing the selected objects to a plurality of destination bins.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention provides a storage, retrieval and processing system for processing objects. The system includes a plurality of storage bins providing storage of a plurality of objects, a programmable motion device, and a plurality of destination bins. The plurality of storage bins are in communication with a retrieval conveyance system. The programmable motion device is in communication with the retrieval conveyance system for receiving the storage bins from the plurality of bins. The programmable motion device includes an end effector for grasping and moving a selected object out of a selected storage bin, and is adapted for movement along a first direction. The plurality of destination bins are provided in at least one linear arrangement along the first direction of movement of the programmable motion device.

Figure 1:
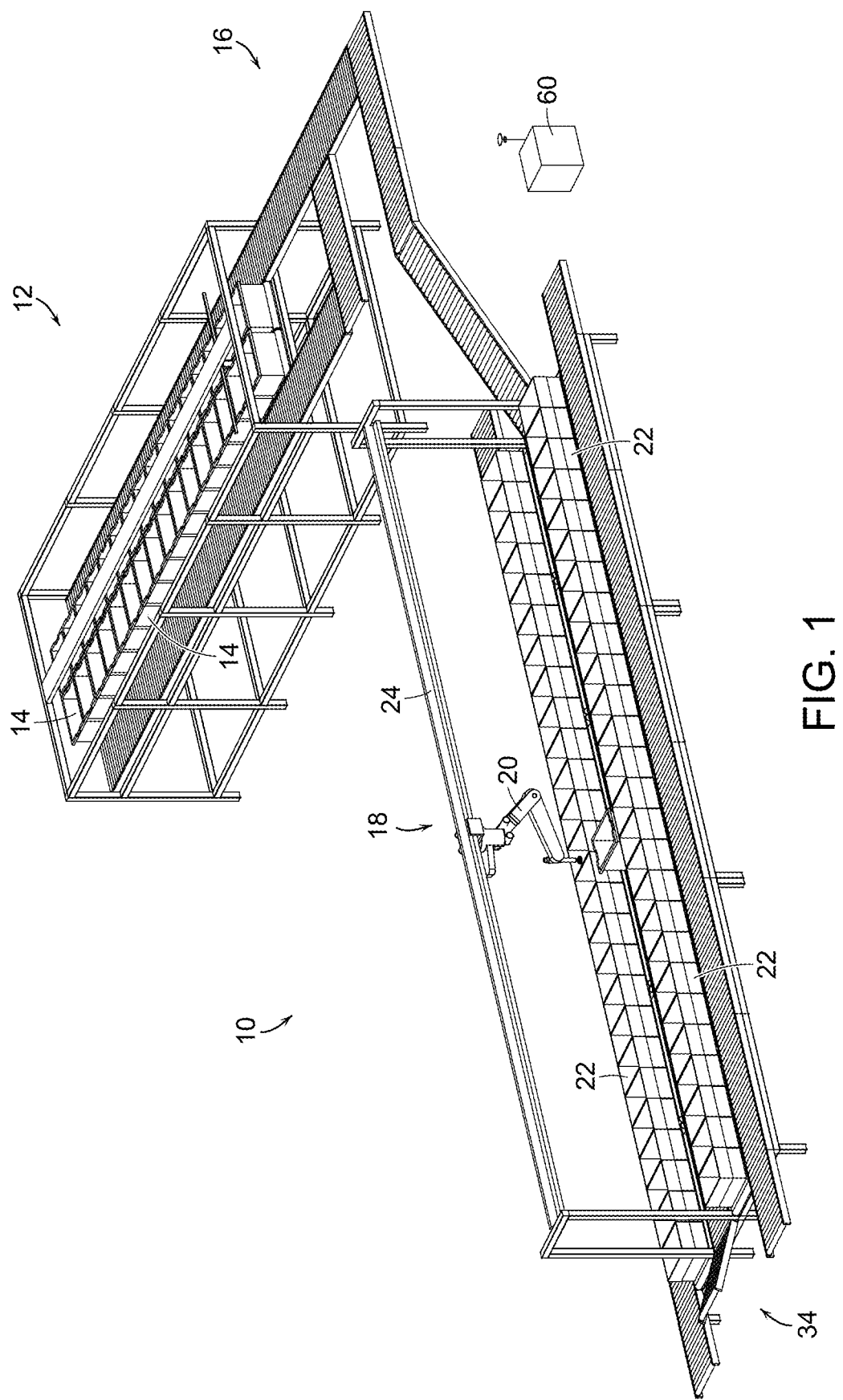
FIG. 1 shows an illustrative diagrammatic view of a storage, retrieval and processing system in accordance with an embodiment of the present invention.

With reference to FIG. 1, a system 10 of an embodiment of the present invention includes storage section 12 for storing a plurality of storage bins 14, a retrieval section 16, and a processing section 18 that includes a programmable motion device 20 and destination bins 22. Generally, storage bins 14 are provided to the processing section 18 by a bin displacement mechanism and the retrieval section 16. As further discussed below, the programmable motion device 20 (e.g., a robotic articulated arm) has a base that moves back and forth along a gantry 24 above the selected storage bin(s). The programmable motion device 20 is programmed to retrieve objects from the selected storage bin(s), and provide them to destination bins 22 in accordance with a manifest.

Figure 2:
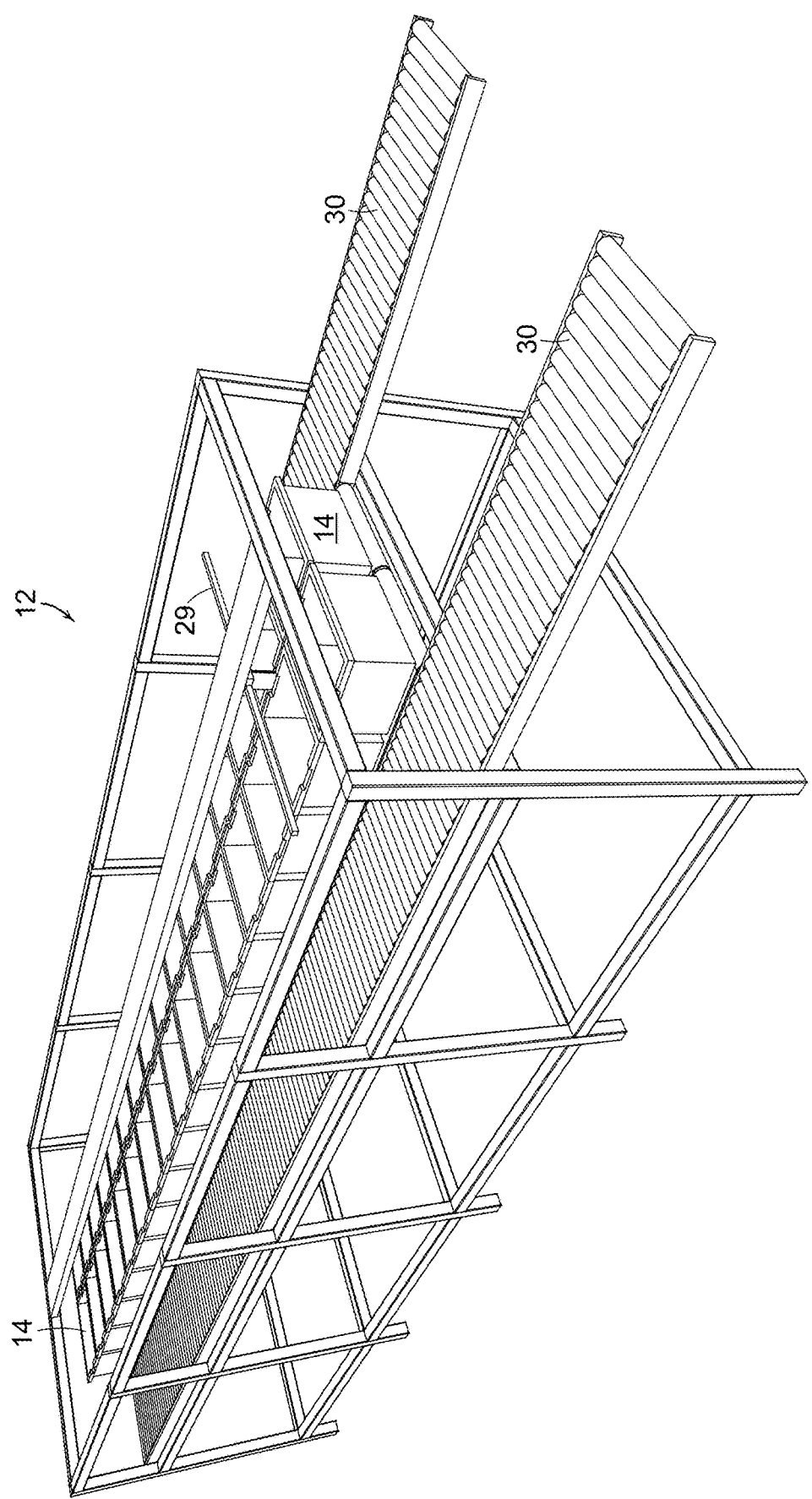
FIG. 2 shows an illustrative diagrammatic view of a portion of a retrieval conveyance system for use in the storage, retrieval and processing system of FIG. 1.
Figure 3A:
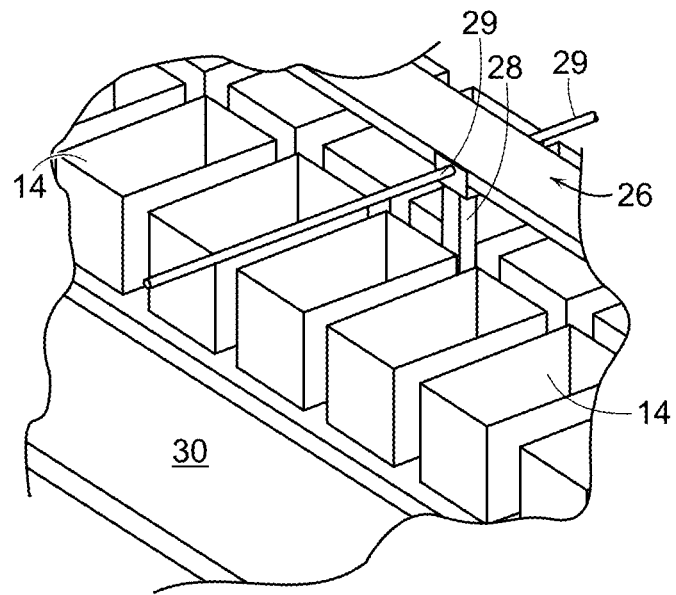
FIGS. 3A and 3B show illustrative diagrammatic views of an embodiment of a bin displacement system for use in a retrieval conveyance system of the invention.
Figure 3B:
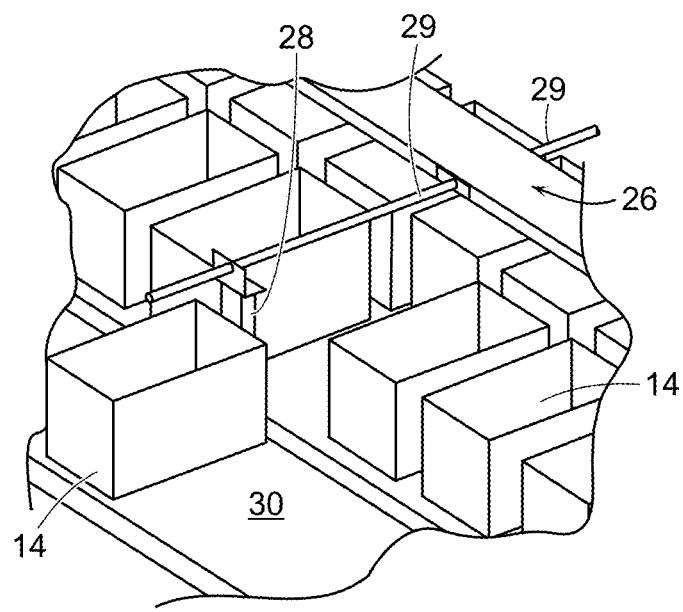

The storage section 12 includes two rows of storage bins 14, and the system knows what is in each bin, and where each bin is positioned along the two rows as further shown in FIG. 2. When a particular storage bin 15 is selected, the system will actuate a bin removal mechanism 26 that travels along between the bins, and stops adjacent the selected bin as shown in FIG. 3A. With reference to FIG. 3B, the system will then move an urging member 28 of the mechanism 26 to push the selected bin onto a conveyor 30 of the retrieval section 16, from which the selected storage bin will be directed to the processing section 18. The removal mechanism 26 may actuate the urging member 28 by any of a variety of processes, including having the support beam 29 be threaded with the urging member 28 being threaded onto the beam 29 such that it moves when the support beam is rotated, or by other mechanical, pneumatic or electronic actuation.

The conveyor 30 (as well as the other conveyors in the system) may be motion controlled so that both the speed and the direction of the conveyor (e.g., rollers or belt) may be controlled. In certain embodiments, the conveyors 30 and all of the conveyors of the retrieval section 16 may be gravity biased to cause any storage bin on any conveyor system to be delivered to the processing section 18. In such a gravity fed system, when a bin is removed, the system will know that all bins uphill of the removed bin will move (e.g., roll) one bin lower on the conveyor. Further new bins may be manually or automatically added to the uphill end of the storage conveyor.

The bins may be provided as boxes or containers or any other type of device that may receive and hold an item. In further embodiments, the bins may be provided in uniform trays (to provide consistency of spacing and processing) and may further include open covers that may maintain the bin in an open position, and may further provide consistency in processing through any of spacing, alignment, or labeling.

Figure 4:
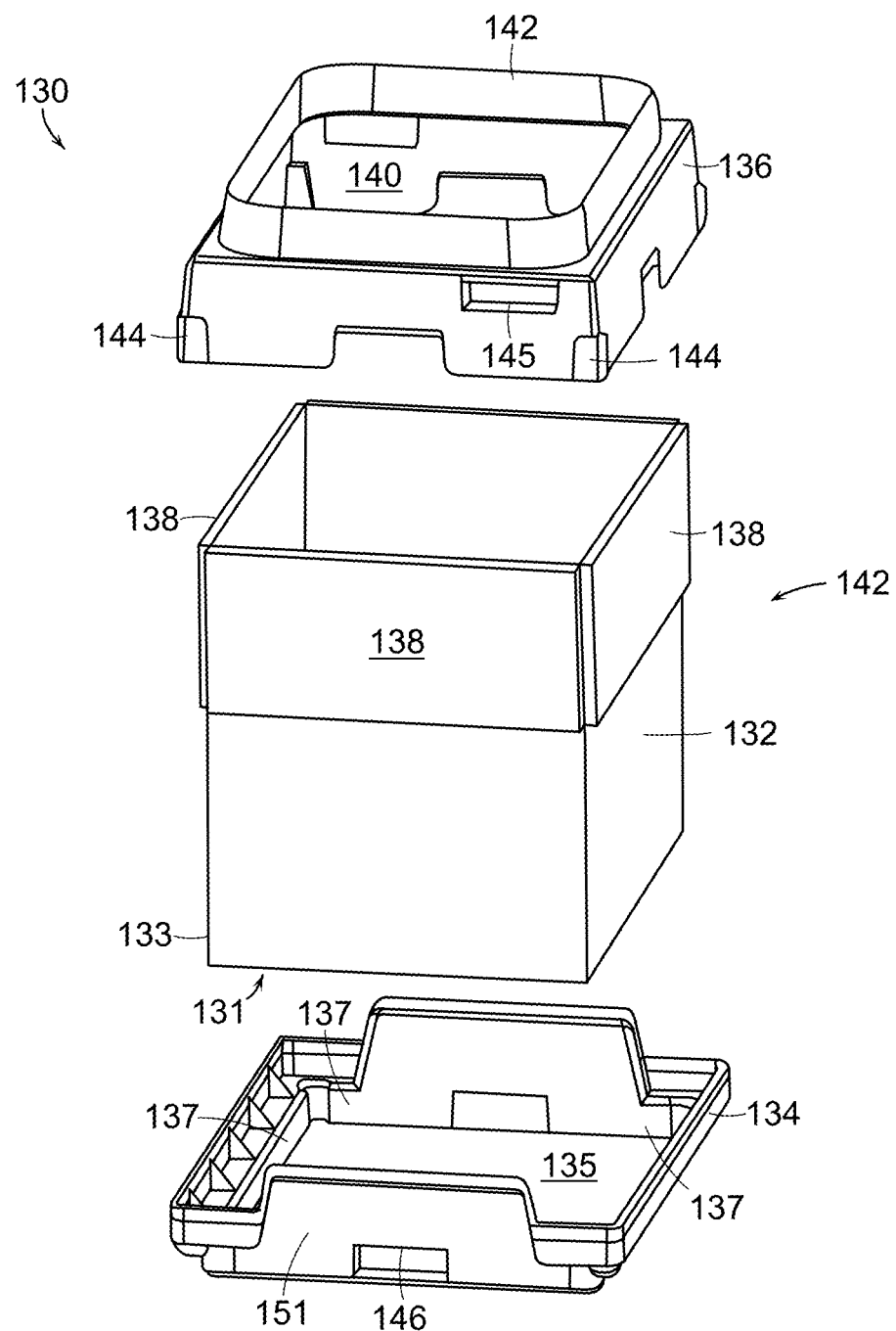
FIG. 4 shows an illustrative diagrammatic exploded view of a box assembly for use as a storage bin or destination bin in accordance with various embodiments of the present invention.

For example, FIG. 4 shows an exploded view of a box tray assembly 130. As shown, the box 132 (e.g., a standard shipping sized cardboard box) may include bottom 131 and side edges 133 that are received by a top surface 135 and inner sides 137 of a box tray 134. The box tray 134 may include a recessed (protected) area in which a label or other identifying indicia 146 may be provided, as well as a wide and smooth contact surface 151 that may be engaged by an urging or removal mechanism as discussed below.

As also shown in FIG. 4, the box 132 may include top flaps 138 that, when opened as shown, are held open by inner surfaces 140 of the box cover 136. The box cover 136 may also include a recessed (protected) area in which a label or other identifying indicia 145 may be provided The box cover 136 also provides a defined rim opening 142, as well as corner elements 144 that may assist in providing structural integrity of the assembly, and may assist in stacking un-used covers on one another. Un-used box trays may also be stacked on each other.

Figure 5:
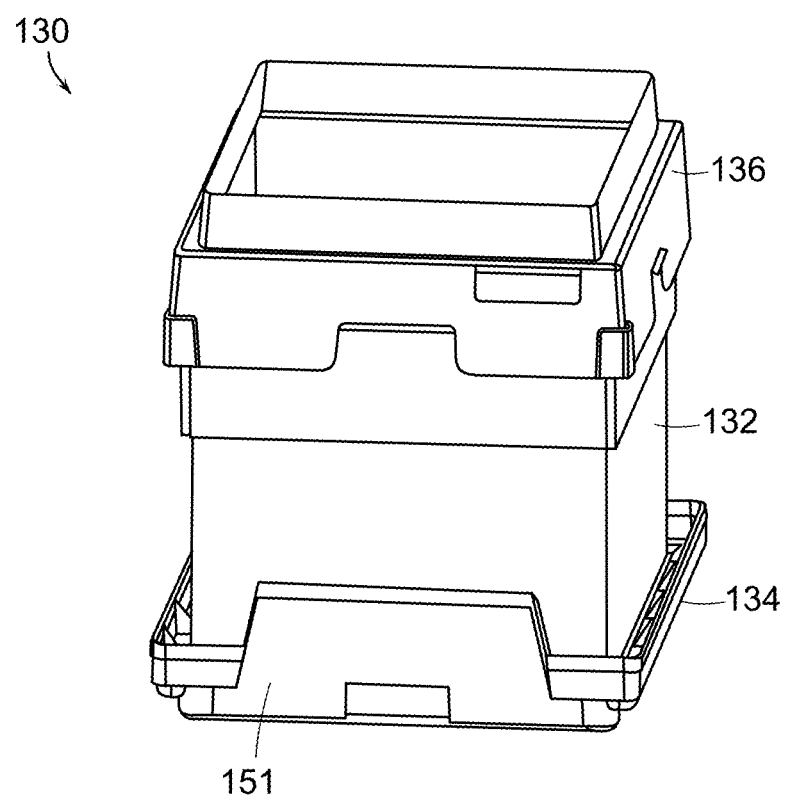
FIG. 5 shows the assembled box tray assembly of FIG. 4.

The box 132 is thus maintained securely within the box tray 134, and the box cover 136 provides that the flaps 138 remain down along the outside of the box permitting the interior of the box to be accessible through the opening 142 in the box cover 136. FIG. 5 shows a width side view of the box tray assembly 130 with the box 132 securely seated within the box tray 134, and the box cover holding open the flaps 138 of the box 132. The box tray assemblies may be used as any or both of the storage bins and destination bins in various embodiments of the present invention.

Figure 6A:
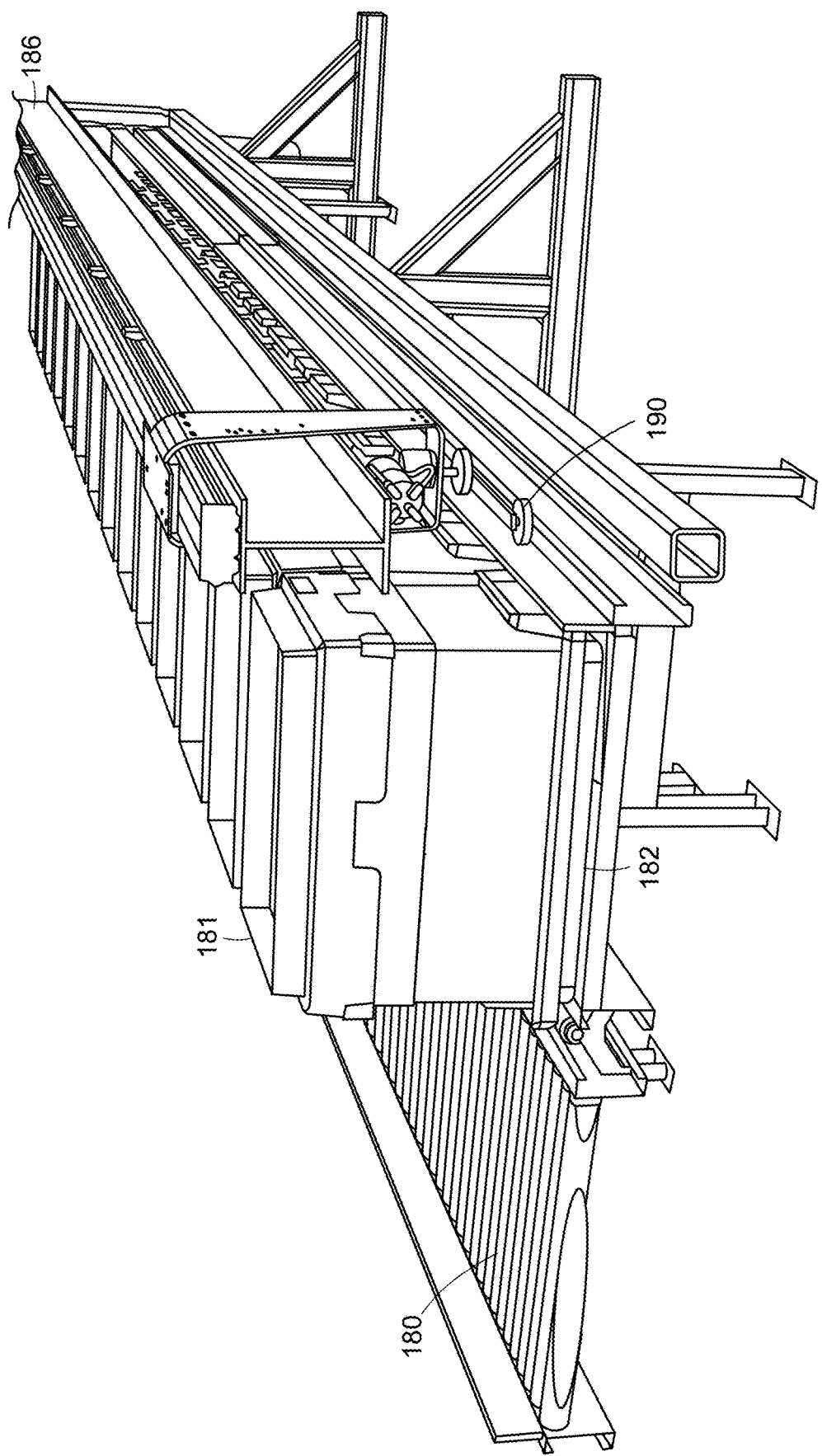
FIGS. 6A-6D show illustrative diagrammatic views of a further embodiment of a bin displacement system for use in further embodiments of the invention.
Figure 6B:
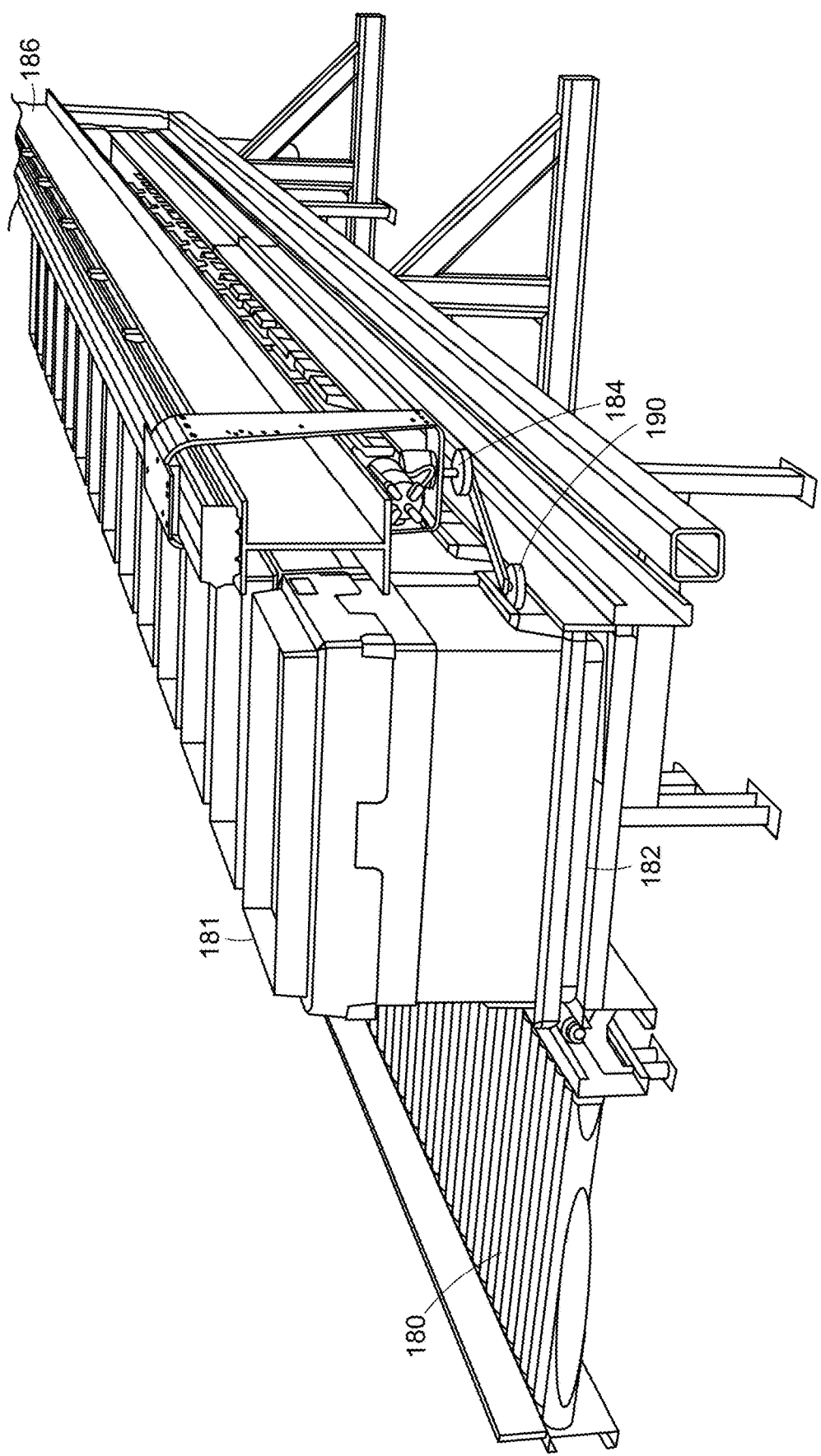
Figure 6C:
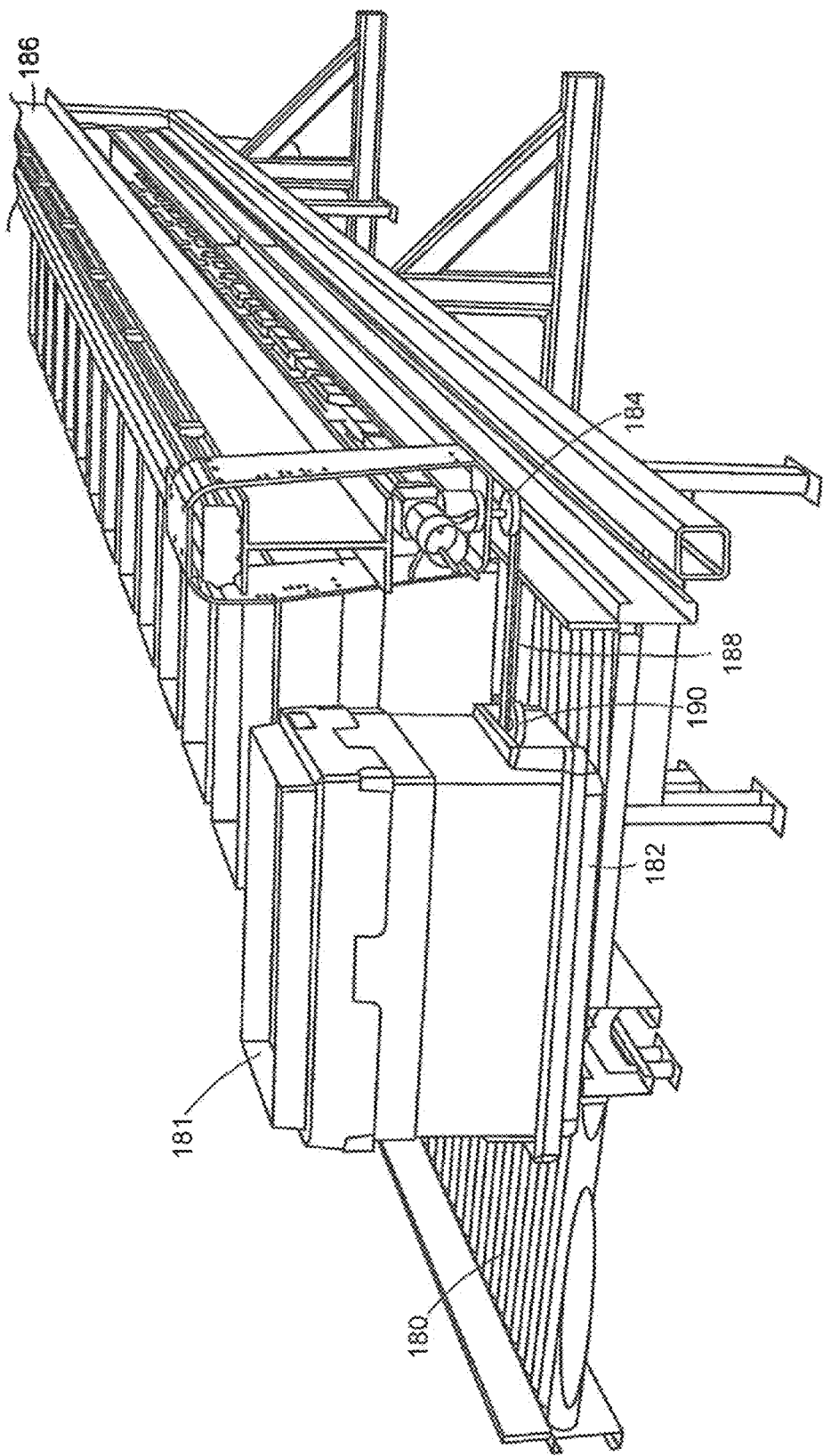
Figure 6D:
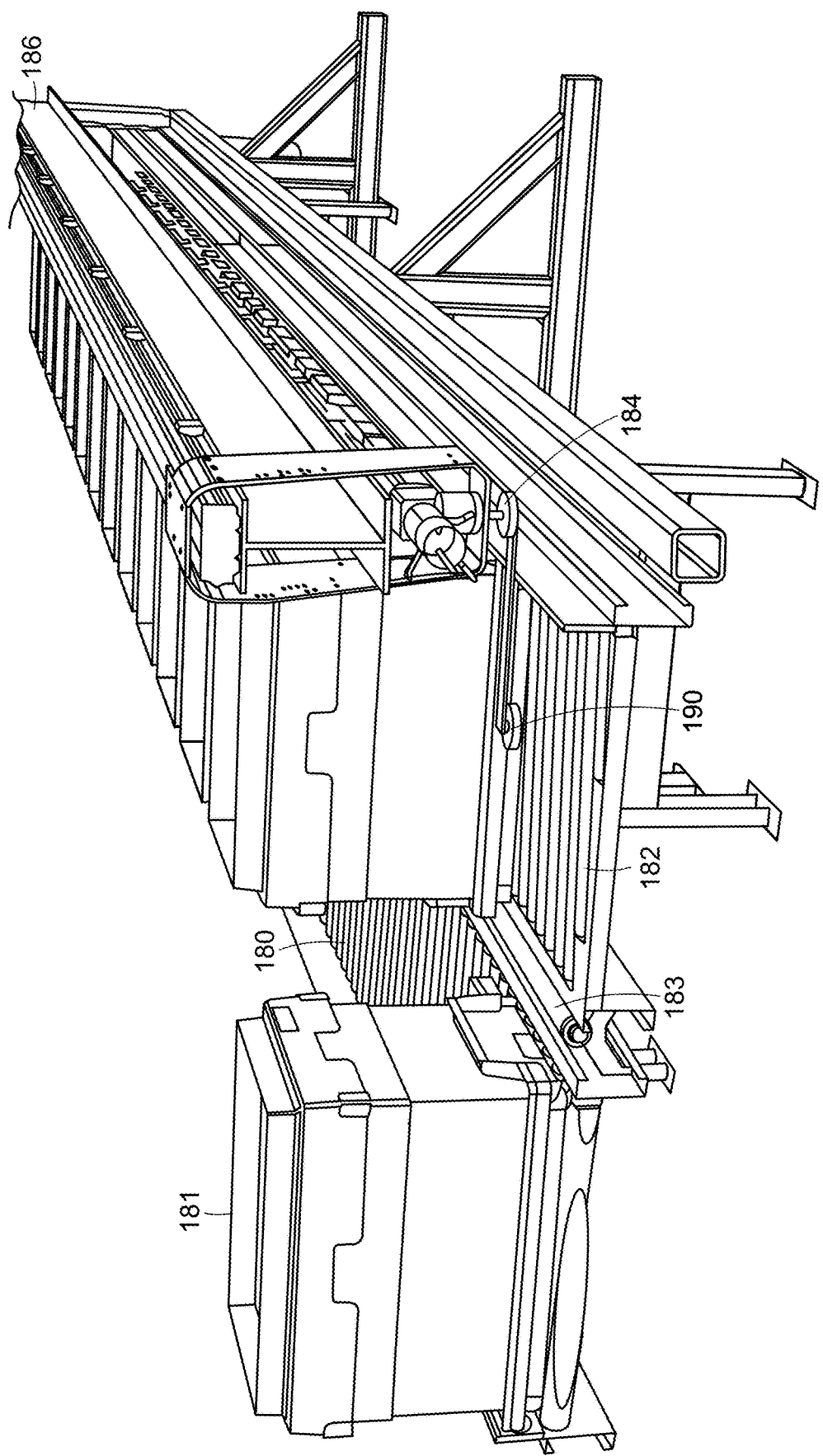

With reference to FIGS. 6A-6D, a box kicker 184 in accordance with an embodiment of the present invention may be suspended by and travel along a track 186, and may include a rotatable arm 188 and a roller wheel 190 at the end of the arm 188. With reference to FIGS. 6B-6D, when the roller wheel 190 contacts the kicker plate 151 (shown in FIG. 4) of a box tray assembly 120, the arm 188 continues to rotate, urging the box tray assembly 180 from a first conveyor 182 to a second conveyor 180. Again, the roller wheel 190 is designed to contact the kicker plate 151 of a box tray assembly 181 to push the box tray assembly 181 onto the conveyor 180. Such a system may be used to provide that boxes that are empty or finished being unloaded may be removed (e.g., from conveyor 182), or that boxes that are full or finished being loaded may be removed (e.g., from conveyor 182). The conveyors 180, 182 may also be coplanar, and the system may further include transition roller 183 to facilitate movement of the box tray assembly 181.

Figure 7:
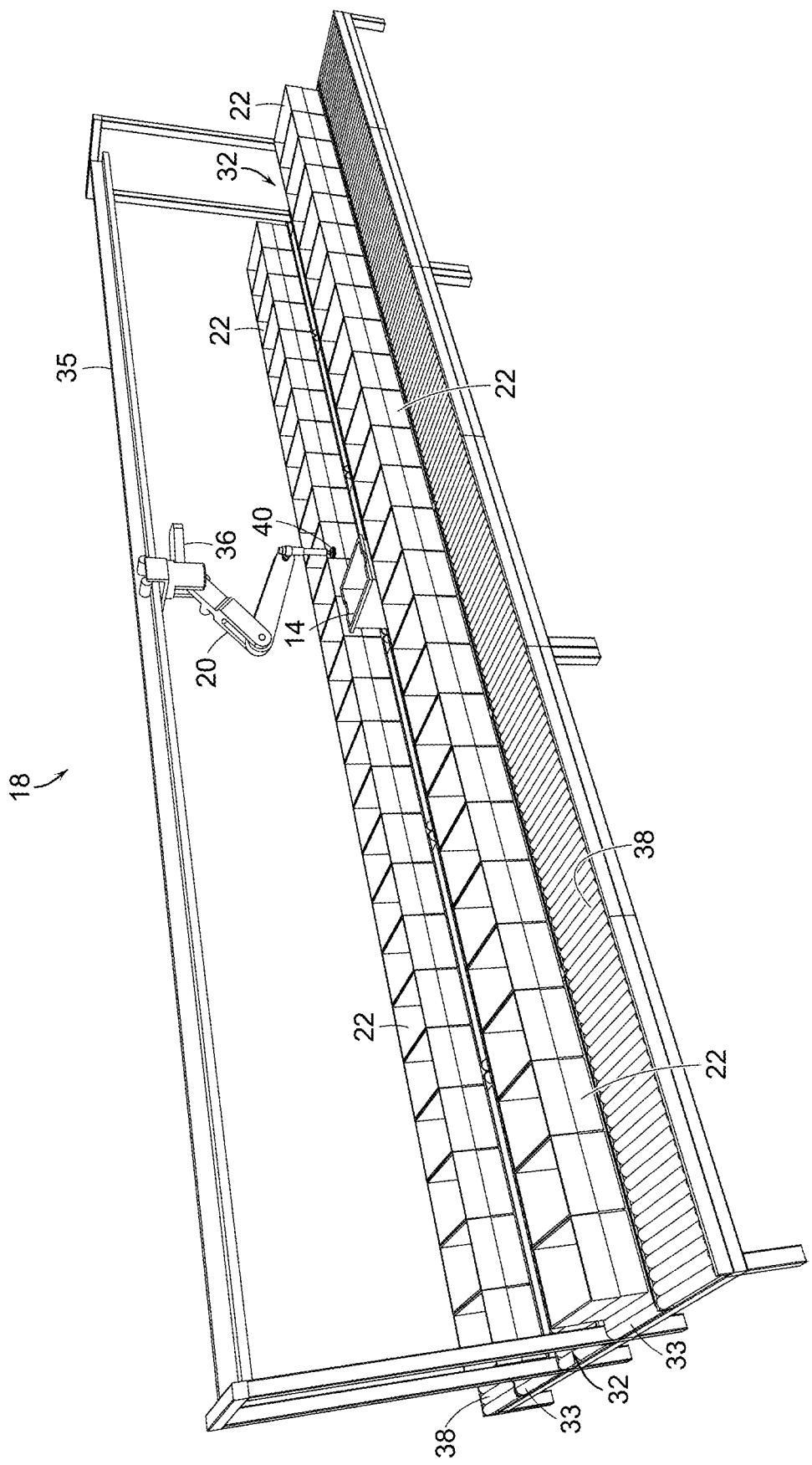
FIG. 7 shows an illustrative diagrammatic view of a processing station in a system of an embodiment of the present invention.

With reference to FIG. 7, the selected storage bin is received along a storage processing conveyor 32. In various embodiments, the selected storage bin 14 may be processed fully and then discarded at an exit end 34 (shown in FIG. 1) of the conveyor 32, or in certain embodiments, multiple selected storage bins may be processed in batches, with the empty boxes being discarded together. During processing, a perception unit 36 is attached to the device base, and looks down into the selected storage bin 14. The end effector 40 of the programmable motion device 20 grasps an object in the bin 14, and moves to deliver the object to a desired destination bin 22. The programmable motion device 20 together with the grasped object may be moved along a gantry 35 to a desired destination bin 22. Each of the objects in the selected storage bin 14 is provided to a destination bin 22 as required, and the bin 14 is then moved away from the processing area.

In other embodiments, and in the event that the bin 14 is not emptied but processing of the bin is otherwise complete, the system may return the bin 14 to the storage section 12 along the retrieval section 16 in the reverse direction. In this case, the returned storage bin may be returned anywhere in a line of the bins (e.g., an end) as long as the system knows where the bin has been returned, and knows how each of the bins may have been moved when the selected storage bin was transferred to the conveyor 32. The storage bins, for example, may be biased (e.g., by gravity) to stack against one of the ends of each row of bins. Once a destination bin is completed, the system may employ the programmable motion device 20 to push the completed bin onto an output conveyor 38.

Figure 8:
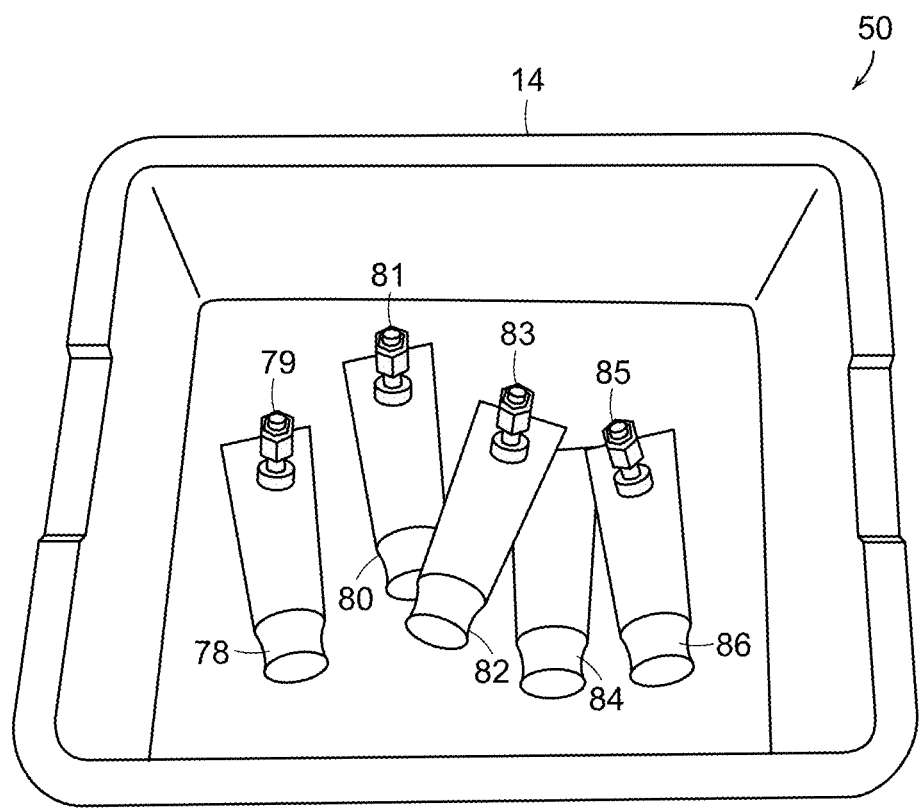
FIG. 8 shows an illustrative diagrammatic view from the perception system of FIG. 5, showing a view of objects within a bin of objects to be processed.

FIG. 8 shows an image view 50 of the bin 14 from the perception unit 36. The image view shows the bin 14 (e.g., on the conveyor), and the bin 14 contains objects 78, 80, 82, 84 and 86. In the present embodiment, the objects are homogenous, and are intended for distribution to different distribution packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 8. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur, or will acquire the object at a grasp location that is very far from the center of mass of the object and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 9A:
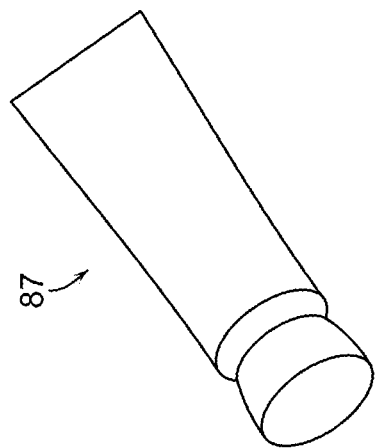
FIGS. 9A and 9B show an illustrative diagrammatic view of a grasp selection process in a storage, retrieval and processing system of an embodiment of the present invention.
Figure 9B:
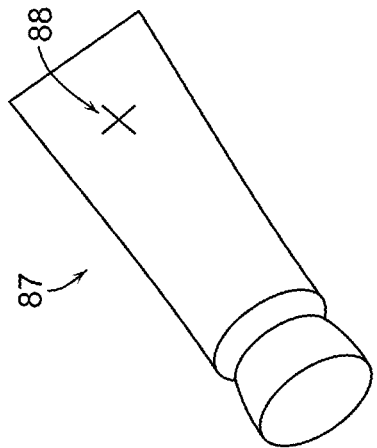

As shown in FIGS. 9A and 9B, the perception system may also identify portions of an object that are the most flat in the generation of good grasp location information. In particular, if an object includes a tubular end and a flat end such as object 87, the system would identify the more flat end as shown at 88 in FIG. 9B. Additionally, the system may select the area of an object where a UPC code appears, as such codes are often printed on a relatively flat portion of the object to facilitate scanning of the barcode.

Figure 11A:
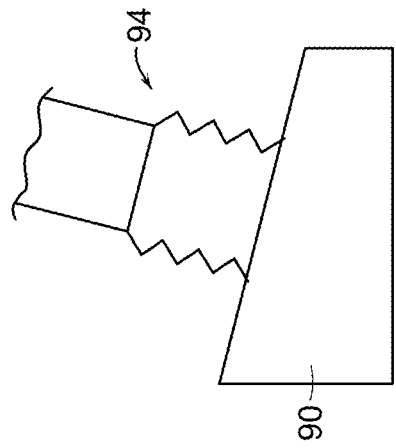
FIGS. 11A and 11B show an illustrative diagrammatic view of a grasp execution process in a storage, retrieval and processing system of an embodiment of the present invention.
Figure 11B:
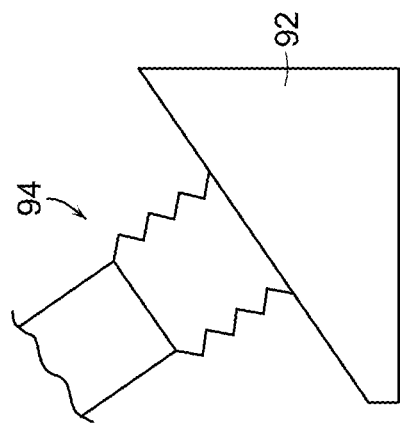
Figure 10A:
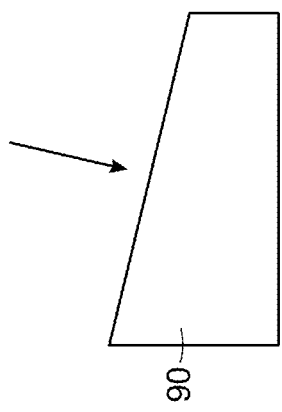
FIGS. 10A and 10B show an illustrative diagrammatic view of a grasp planning process in a storage, retrieval and processing system of an embodiment of the present invention.
Figure 10B:
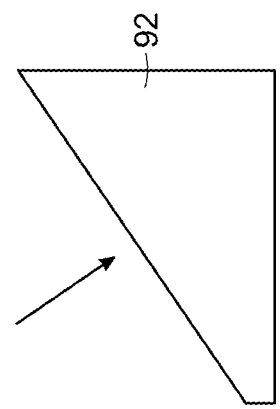

FIGS. 10A and 10B show that for each object 90, 92, the grasp selection system may determine a direction that is normal to the selected flat portion of the object 90, 92. As shown in FIGS. 11A and 11B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical picks), and that such grasp points may be chosen using fiducial features as grasp points, such as picking on a barcode, given that barcodes are almost always applied to a flat spot on the object.

With reference again to FIG. 7, destination bins 22 that are full or are otherwise finished being processed, may be moved to a respective output conveyor 38 for further processing, e.g., further packaging labeling or shipment. Such bins (e.g., box assemblies as discussed above), may be moved from a respective destination bin processing conveyor 33 to an output conveyor 38 by any of a variety of means, including having either human personnel move the bin, having the robot move the bin, or employing a box kicker 184 as discussed above with reference to FIGS. 6A-6D. Such a box kicker 184 may, for example, be employed along each long side of the storage processing conveyor 32, and be used to urge completed boxes from a conveyor 33 to an adjacent conveyor 33.

Figure 12:
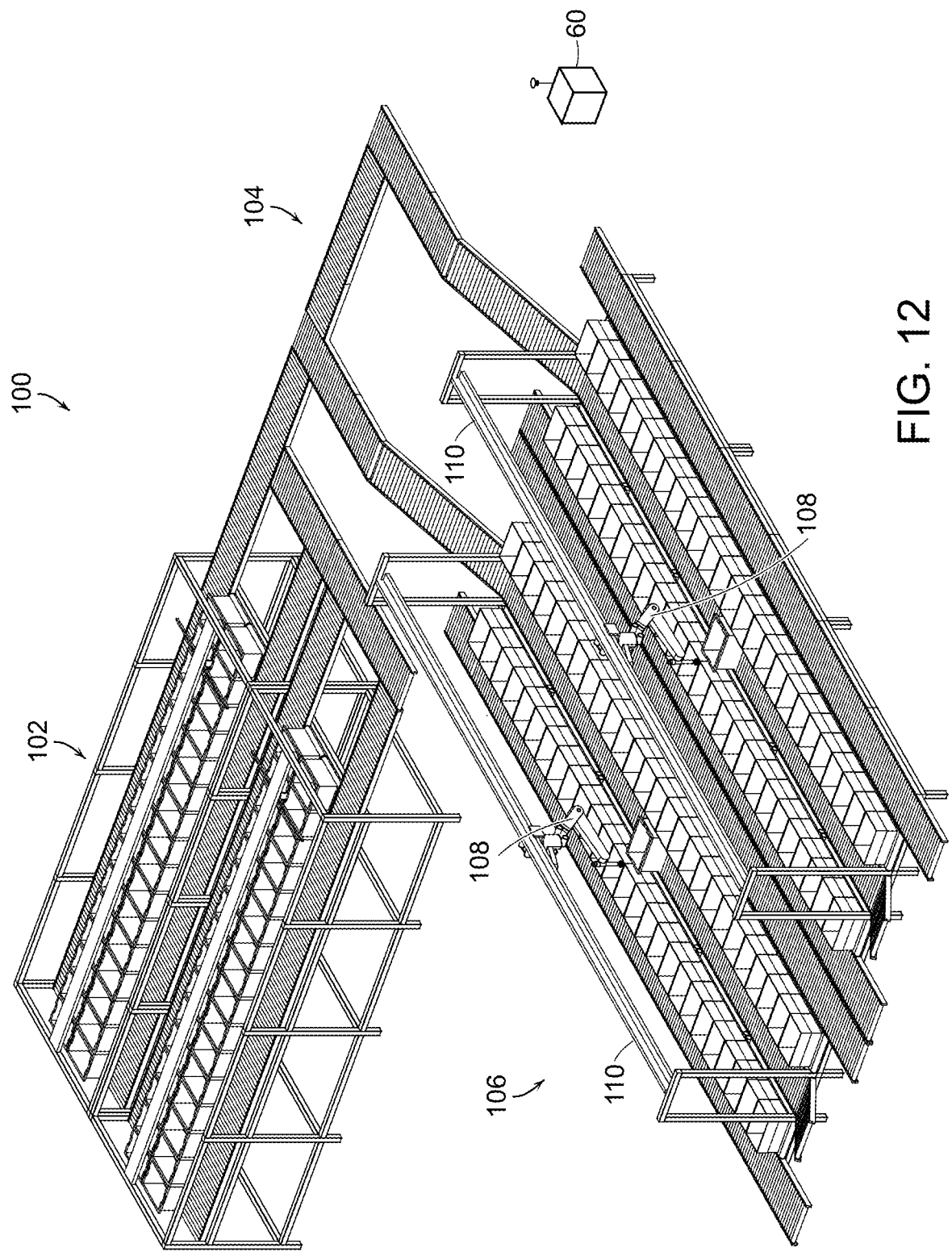
FIG. 12 shows an illustrative diagrammatic view of a storage, retrieval and processing system in accordance with a further embodiment of the present invention involving a plurality of rows of processing stations.

With reference to FIG. 12, in accordance with a further embodiment, the system 100 may include multiple sets (e.g., 2) of storage bins in rows with bin removal mechanisms at a storage section 102, each of which is in communication with a retrieval section 104, which in turn, is in communication with multiple (e.g., two) parallel processing sections 106, each of which includes a programmable motion device 108 that runs along a gantry 110.

Figure 13:
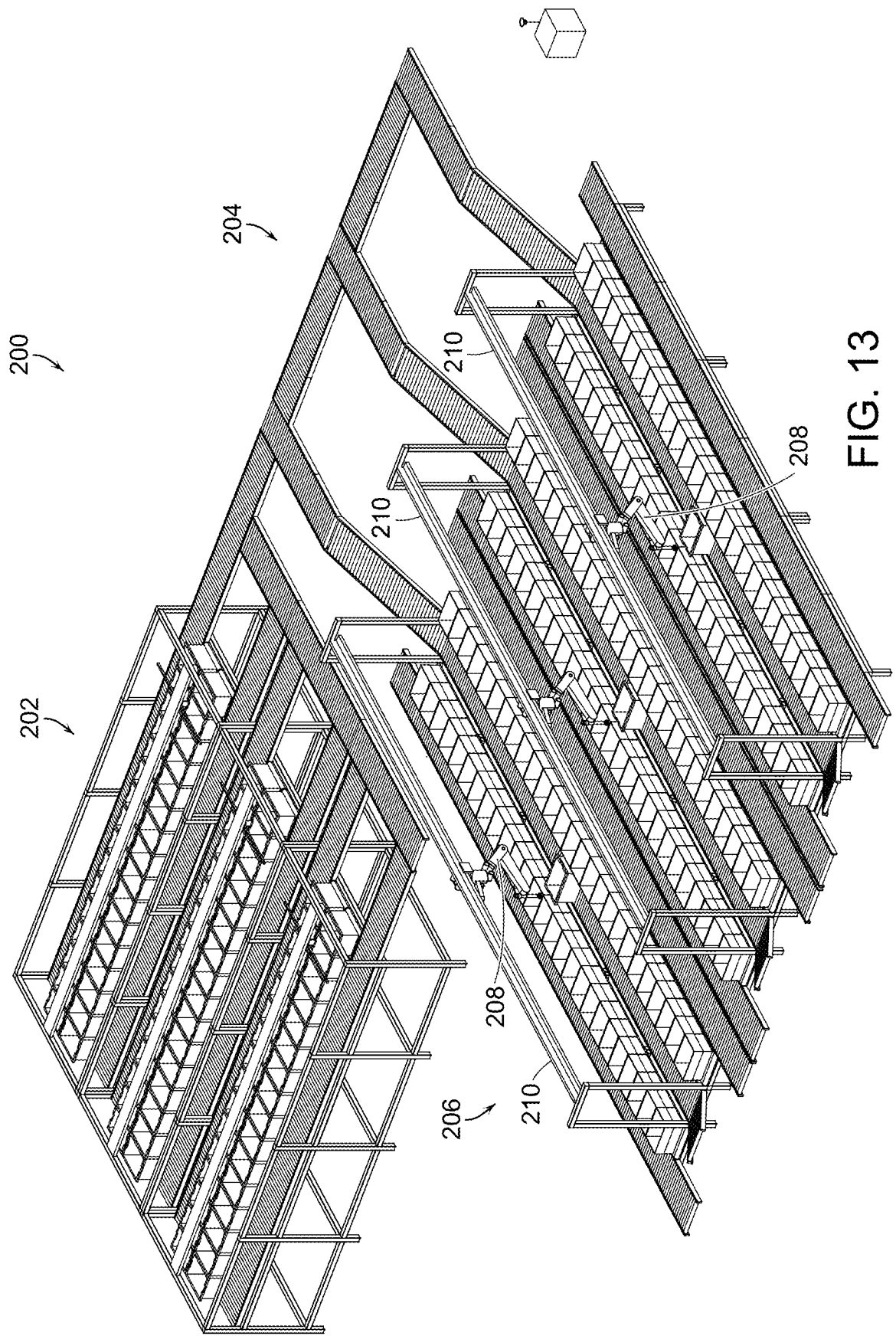
FIG. 13 shows an illustrative diagrammatic view of a storage, retrieval and processing system in accordance with a further embodiment of the present invention involving further retrieval conveyance systems and further processing stations.

In accordance with a further embodiment and with reference to FIG. 13, the system 200 may provide multiple sets (e.g., three) of storage bins in rows with bin removal mechanisms at a storage section 202, each of which is in communication with a retrieval section 204, which in turn, is in communication with multiple (e.g., three) parallel processing sections 206, each of which includes a programmable motion device 208 that runs along a gantry 210.

Control of the overall system 10, 100 and 200 may be provided by a computer system 60 that is in communication with the bin removal mechanism, the conveyors, as well the programmable motion device 20. The computer system 60 also contains the knowledge (continuously updated) of the location and identity of each of the storage bins, and contains the knowledge (also continuously updated) of the location and identity of each of the destination bins. The system therefore, directs the movement of the storage bins and the destination bins, and retrieves objects from the storage bins, and distributes the objects to the destination bins in accordance with an overall manifest that dictates which objects must be provided in which destination boxes for shipment, for example, to distribution or retail locations.

Those skilled in the art will appreciate that numerous modification and variations may be made to the above disclosed embodiments without departing from the spirit and scope of the present invention.

What is claimed is:

1. An object processing system comprising:
   a storage section including a plurality of storage bins providing storage of a plurality of objects, said plurality of storage bins provided in at least one input linear arrangement adjacent to a conveyor of a retrieval section;
   a storage bin displacement system that urges a selected storage bin from the storage section onto the conveyor of the retrieval system; and
   a processing section including a programmable motion device in communication with the conveyor of the retrieval system for receiving the selected storage bin from the plurality of storage bins, said programmable motion device including an end effector for grasping and moving a selected object out of the selected storage bin;
   the processing section further including a plurality of destination bins being provided in at least one output linear arrangement along an output direction adjacent the programmable motion device, wherein the programmable motion device is adapted to place the selected object from the selected storage bin into a selected destination bin among the plurality of destination bins; and
   the processing section further including at least one output conveyor of the processing section adjacent the at least one output linear arrangement of the plurality of destination bins, the at least one output conveyor for receiving completed destination bins from among the plurality of destination bins and for conveying the completed destination bins to a further processing location,
   wherein the one or more selected storage bins are returned to the plurality of storage bins by moving the one or more selected storage bins in a reverse direction on the conveyor of the retrieval system.

2. The object processing system as claimed in claim 1, wherein the storage bin displacement system includes an urging member that is adapted to travel along the at least one input linear arrangement.

3. The object processing system as claimed in claim 1, wherein the plurality of storage bins is positionally biased to a first end of the at least one input linear arrangement such that when the selected storage bin is removed, remaining storage bins are brought closer together to fill an input bin space left by the selected storage bin.

4. The object processing system as claimed in claim 3, wherein the plurality of storage bins is positionally biased by gravity.

5. The object processing system as claimed in claim 1, wherein the programmable motion device is suspended from a gantry, and is movable along the output direction while suspended from the gantry.

6. The object processing system as claimed in claim 5, wherein the programmable motion device is an articulated arm that reciprocally moves between two rows of the plurality of destination bins, and the articulated arm is adapted to place the selected object into the selected destination bin.

7. The object processing system as claimed in claim 1, wherein the object processing system further includes a completed destination bin displacement system that urges each of the completed destination bins from among the plurality of destination bins onto the at least one output conveyor of the processing section.

8. The object processing system as claimed in claim 7, wherein the completed destination bin displacement system includes a box kicker that is adapted to travel along the output direction.

9. The object processing system as claimed in claim 1, wherein the plurality of destination bins is positionally biased to a first end of the at least one output linear arrangement such that when a completed destination bin is removed, remaining destination bins are brought closer together to fill an output bin space left by the completed and removed completed destination bin.

10. The object processing system as claimed in claim 9, wherein the plurality of destination bins is positionally biased by gravity.

11. An object processing system comprising:
    a storage section including a plurality of storage bins providing storage of a plurality of objects, said plurality of storage bins provided in at least one input linear arrangement adjacent to a conveyor of a retrieval section, and said plurality of storage bins being positionally biased to a first end of the input linear arrangement such that when a selected storage bin is removed, remaining storage bins are brought closer together to fill an input bin space left by the selected and removed storage bin;
    a processing section including a programmable motion device in communication with the conveyor of the retrieval system for receiving a selected storage bin from the plurality of storage bins, said programmable motion device including an end effector for grasping and moving a selected object out of the selected storage bin;
    the processing section further including a plurality of destination bins being provided in at least one output linear arrangement along an output direction adjacent the programmable motion device, wherein the programmable motion device is adapted to place a selected object from the selected storage bin into a selected destination bin among the plurality of destination bins;
    the processing section further including at least one output conveyor of the processing section adjacent the at least one output linear arrangement of the plurality of destination bins, the at least one output conveyor for conveying a completed destination bin to a further processing location, the plurality of destination bins being positionally biased to a first end of the output linear arrangement such that when the completed destination bin is removed, remaining destination bins are brought closer together to fill an output bin space left by the completed destination bin; and a computer system that tracks an identity and a location of each storage bin among the plurality of storage bins, wherein the computer system updates the location of each storage bin within the remaining storage bins in response to the selected storage bin being removed from the plurality of storage bins, and wherein the computer system updates the location of each destination bin within the remaining destination bins in response to the completed destination bin being removed from the plurality of destination bins.

12. The object processing system as claimed in claim 11, wherein the plurality of storage bins is positionally biased by gravity.

13. The object processing system as claimed in claim 11, wherein the plurality of destination bins is positionally biased by gravity.

14. The object processing system as claimed in claim 11, wherein the object processing system further includes a storage bin displacement system that urges the selected storage bin onto the conveyor of the retrieval system.

15. The object processing system as claimed in claim 14, wherein the storage bin displacement system includes an urging member that is adapted to travel along the at least one input linear arrangement.

16. The object processing system as claimed in claim 11, wherein the programmable motion device is suspended from a gantry, and is movable along the output direction while suspended from the gantry.

17. The object processing system as claimed in claim 16, wherein the programmable motion device is an articulated arm that reciprocally moves between two rows of the plurality of destination bins, and the articulated arm is adapted to place the selected object into the selected destination bin.

18. The object processing system as claimed in claim 11, wherein the object processing system further includes a completed destination bin displacement system that urges the completed destination bin from among the plurality of destination bins onto the at least one output conveyor of the processing section.

19. The object processing system as claimed in claim 18, wherein the completed destination bin displacement system includes a box kicker that is adapted to travel along the output direction.

20. A method of processing objects, said method comprising:
providing storage of a plurality of objects in a plurality of storage bins included in a storage section, said plurality of storage bins provided in at least one input linear arrangement adjacent to a conveyor of a retrieval section,
displacing a selected storage bin from among the plurality of storage bins onto the conveyor of the retrieval system, said plurality of storage bins being positionally biased to a first end of the at least one input linear arrangement such that when the selected storage bin is removed, remaining storage bins are brought closer together to fill an input bin space left by the selected and removed storage bin;
updating a location of each storage bin within the remaining storage bins in a computer system responsive to the selected storage bin being removed from among the plurality of storage bins;
receiving the selected storage bin from the plurality of storage bins at a programmable motion device included in a processing section, the programmable motion device being in communication with the conveyor of the retrieval system;
grasping and moving a selected object out of the selected storage bin using an end effector of the programmable motion device;
providing a plurality of destination bins in at least one output linear arrangement along an output direction adjacent the programmable motion device of the processing section;
placing the selected object from the selected storage bin into a selected destination bin among the plurality of destination bins using the end effector of the programmable motion device;
displacing a completed destination bin from among the plurality of destination bins onto at least one output conveyor of the processing section adjacent the at least one output linear arrangement of the plurality of destination bins, the at least one output conveyor conveying the completed destination bin to a further processing location using at least one output conveyor, the plurality of destination bins being positionally biased to a first end of the at least one output linear arrangement such that when the completed destination bin is removed, remaining destination bins are brought closer together to fill an output bin space left by the completed destination bin; and
updating a location of each destination bin within the remaining destination bins in the computer system responsive the completed destination bin being removed from among the plurality of destination bins.

21. The method as claimed in claim 20, wherein the plurality of storage bins is positionally biased by gravity.

22. The method as claimed in claim 20, wherein the plurality of destination bins is positionally biased by gravity.

23. The method as claimed in claim 20, wherein displacing the selected storage bin from among the plurality of storage bins onto the conveyor of the retrieval system includes urging the selected storage bin onto the conveyor of the retrieval system with a storage bin displacement system.

24. The method as claimed in claim 23, wherein the storage bin displacement system includes an urging member that is adapted to travel along the at least one input linear arrangement.

25. The method as claimed in claim 20, wherein the programmable motion device is suspended from a gantry, and the method further comprises moving the programmable motion device to the selected destination bin along the output direction while suspended from the gantry.

26. The method as claimed in claim 25, wherein the programmable motion device is an articulated arm suspended from the gantry that reciprocally moves between two rows of the plurality of destination bins, and the articulated arm is adapted to place the selected object into the selected destination bin.

27. The method as claimed in claim 20, wherein displacing the completed destination bin from among the plurality of destination bins onto the at least one output conveyor includes urging the completed destination bin from among the plurality of destination bins onto at least one output conveyor with a completed destination bin displacement system.

28. The method as claimed in claim 27, wherein the completed destination bin displacement system includes a box kicker that is adapted to travel along the output direction.

* * * * *